May 19, 1931. W. S. TONCRAY 1,805,963
AIR COOLING AND CONDITIONING APPARATUS
Filed May 7, 1930 3 Sheets-Sheet 2
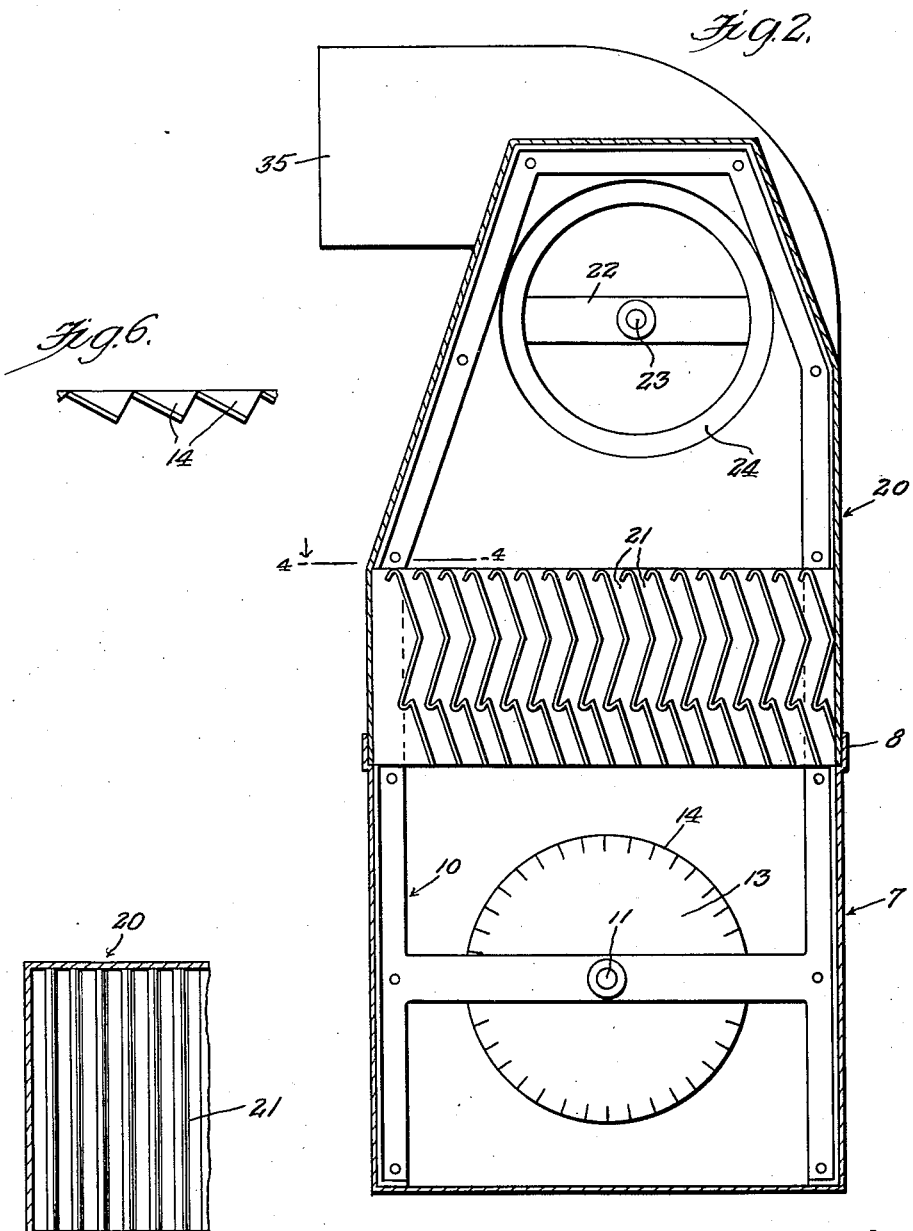
Inventor
W. S. Toncray,
By Clarence A. O'Brien
Attorney

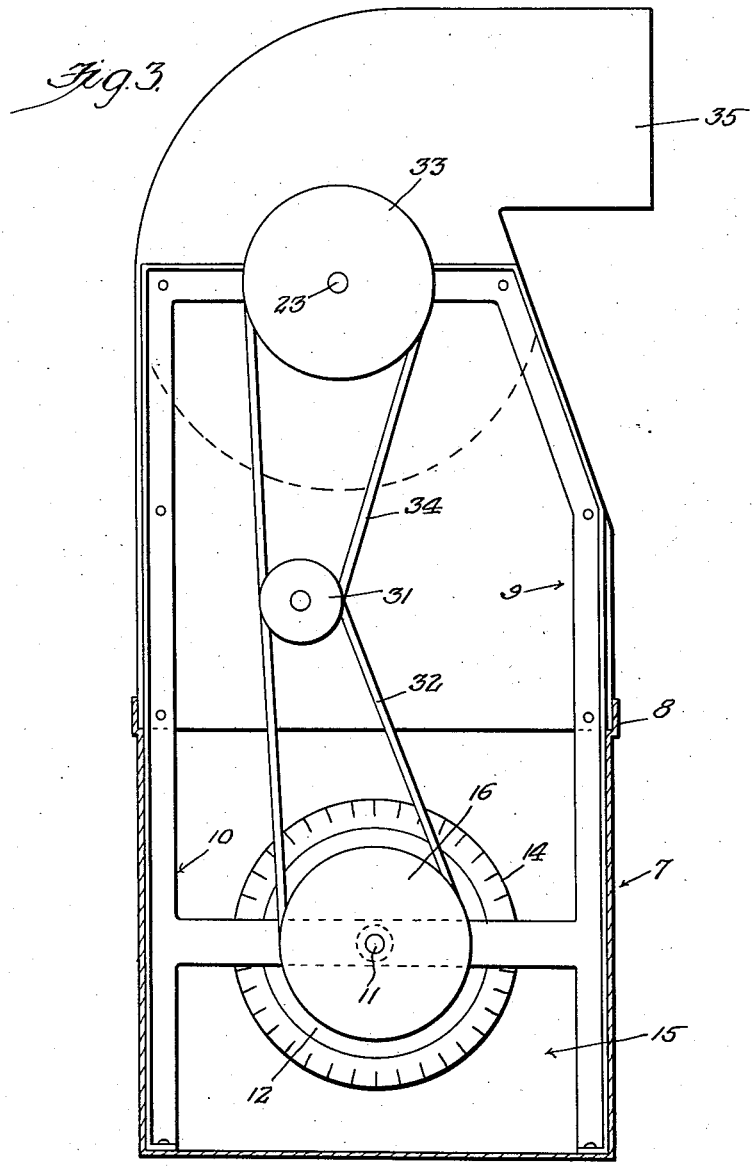
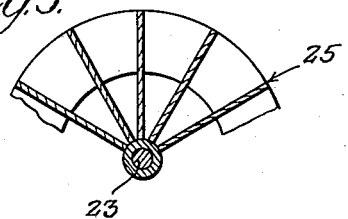

Patented May 19, 1931

1,805,963

UNITED STATES PATENT OFFICE

WILLIAM S. TONCRAY, OF PHOENIX, ARIZONA

AIR COOLING AND CONDITIONING APPARATUS

Application filed May 7, 1930. Serial No. 450,548.

This invention relates to a structure for treating air to condition it for safe and sane ventilating purposes; and the inventive conception is such in principal as to permit it to be embodied in either a relatively large air cooling system of the stationary type, or in a portable cabinet type of cooler for home use.

Briefly stated, the novelty is predicated upon a structure characterized by a source of power preferably in the form of a noiseless electric motor, a suction and circulation fan, and a novel water spray suction for removing dust, cleaning the air, and moistening and cooling the air before it is delivered into the room.

The particular structure of parts which is to make up the complete apparatus, will be explicitly described and featured in the following description and drawings accompanying.

In the drawings:—

Fig. 2 is a vertical section at right angles taken approximately on the plane of the line 2—2 of Fig. 1.

Fig. 3 is a similar view taken on the line 3—3 of Fig. 1.

Fig. 4 is a fragmentary horizontal section on the line 4—4 of Fig. 2.

Fig. 5 is a fragmentary detail section of a portion of the fan.

Fig. 6 is a detail elevational view of a fragment of the peripheral portion of one of the rotary agitators.

Figure 1:
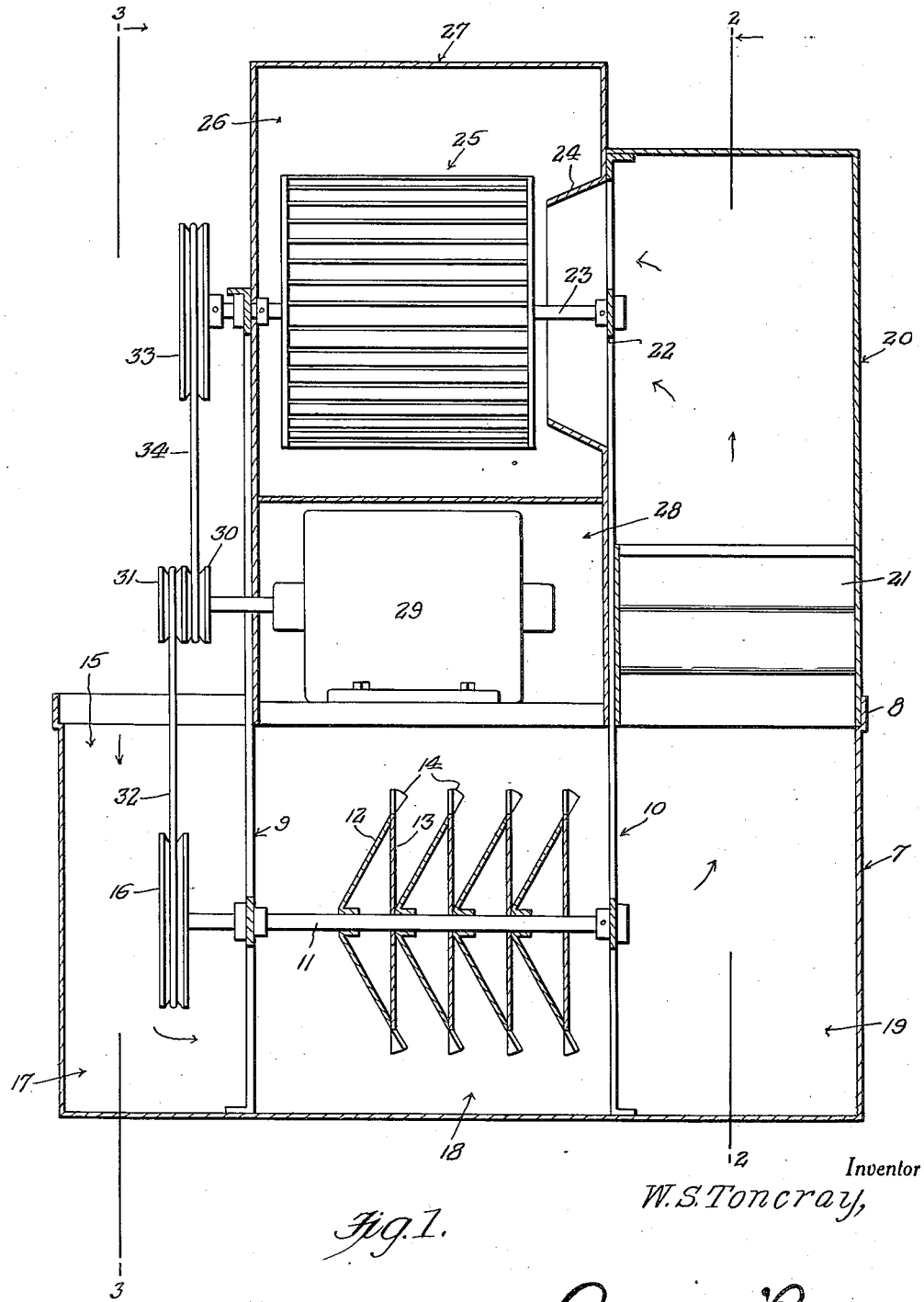
Figure 1 is a vertical sectional view through the complete assembly of parts showing the association of details.

Referring first to Fig. 1, it will be seen that the reference character 7 represents a substantially rectangular box functioning as a water tank. This is provided at its open top with an outstanding marginal rim and supporting ledge 8. This tank is adapted to contain a predetermined quantity of water.

Attached to and rising above the tank are vertical spaced parallel frames 9 and 10, the portions of the frames arranged within the tank being provided with bearings to accommodate a horizontal rotary shaft 11.

On this shaft, I provide a gang of agitators comprising a bracing cone 12 and a disk 13 abutting the open side of the cone and having its peripheral portion provided with a multiplicity of projecting blades or teeth 14. These agitators serve to stir the water and to cause it to swirl upwardly into a fine spray. In this connection it might be stated that the left hand end portion of the tank 7 as shown in Fig. 1, constitutes the air inlet 15. Located in this inlet is a pulley 16 on the adjacent end of the shaft 11.

With this arrangement, the tank is virtually divided into three compartments, namely the air intake compartment 17, the central agitating compartment 18, and the moistened air outlet compartment 19. Supported against the frame 10 and above the compartment 19, is an open bottom rectangular casing 20 which is provided at its point of communication with the chamber 19, with a plurality of longitudinally spaced baffle plates 21. These baffle plates are of the irregular cross sectional configuration shown in Fig. 2.

The purpose of the plates is to separate the water from the upwardly circulating air column and to cause the water to drip into the tank. This baffle plate assembly prevents the air from becoming too wet. It will be noted that the upper portion of the frame 10 is provided with a spider as at 22 and this spider is formed with a bearing to accommodate the adjacent end portion of the fan shaft 23.

In this connection I call attention to the frusto-conical air nipple 24. The fan is generally represented by the numeral 25 and is located in the upper compartment 26 of the fan housing structure 27. This structure 27 is also seated in the rim 8 of the tank and is disposed between the frames 9 and 10 and located just above the agitating compartment 18.

The lower chamber of the housing is indicated at 28 and the electric motor 29. On the motor shaft are provided a pair of grooved pulleys 30 and 31 respectively. The pulleys 31 cooperate with the pulley 16 to accommodate the power transmission belt 32. In addition, the pulley 30 is located beneath a larger pulley 33 on the exterior end of the fan shaft and these pulleys 30 and 33 accommodate the fan belt 34.

The fan is of the construction shown in Fig. 5, and includes radial blades and peripheral connecting rings, thus defining a series of pockets for producing the desired suction and circulation of air.

It will be observed that the upper end portion of the housing 27 is fashioned with a right angularly disposed elbow 35 which defines the outlet for the conditioned and cooled air. In operation, it is obvious that the air to be treated enters the air inlet 15 and passes downwardly to the water in compartment 17. It permeates the water and mixes with the water spray produced by the rotation of the gang of agitators. The natural affinity of the air and water, causes the air to take up a certain amount of moisture.

This circulation of air thru the water and mixture with the water is produced by the rotation of the suction fan 25 which is in open communication with the water tank through the medium of the compartment 19, and the casing 20 as well as the air nipple 24.

As the circulating column of moisture laden air is drawn upwardly between the baffle plates, it is to be acted upon by these baffle plates to remove the major portion of the moisture and to cause the surplus moisture to drip back into the tank. The cleaned moistened and cooled air passes through the casing 20, through the nipple 24 and into the fan housing where it is thrown outwardly under the action of the rotating fan and discharged into the room thru the outlet 35.

As before stated, the apparatus is such in general construction as to permit it to be incorporated in a relatively large air cooling system, or to be incorporated in a portable cabinet for home use.

Particularly do I wish to emphasize, the simplified arrangement, whereby a single light-weight electric motor, serves to simultaneously propel the upper and upper and lower shafts 11 and 23 whereby to actuate the fan and agitating means in unison and in proper relative speed relationship. Moreover, I emphasize the separating baffles located in the casing 20 above the tank compartment 19, whereby to prevent the air from becoming objectionally wet.

The present embodiment of the invention has been disclosed in considerable detail merely for the purpose of exemplification since in actual practice it attains the features of advantage enumerated as desirable in the statement of the invention and the above description.

It is to be understood that by describing in detail herein any particular form, structure, or arrangement, it is not intended to limit the invention beyond the terms of the several claims, or the requirements of the prior art.

Having thus described my invention what I claim as new is:—

1. In an apparatus of the class described, an open top water tank, a horizontal shaft mounted for rotation therein, a pulley on said shaft, a plurality of bladed agitating elements assembled on said shaft, a separating casing supported on the tank and including a plurality of baffle plates arranged in the path of movement of the moistened air, said casing provided with an air outlet, a fan housing communicating with said outlet, a shaft mounted for rotation in said housing, a fan carried by said shaft, a pulley on said shaft, an electric motor arranged in said housing, and provided with pulleys, and belts trained over the respective pulleys for simultaneously actuating the shaft, agitators and fans, said fan housing being provided with a final air outlet for discharging the conditioned air into the room.

2. In an air conditioning apparatus of the class described, an open top water tank, a pair of uprights arranged in said tank and provided with bearings, a shaft mounted for rotation in said bearings, operating means for the shaft, a plurality of longitudinally spaced cones mounted on the shaft, a disk associated with the open side of each cone, the peripheral edge portions of the disk being serrated to provide agitating and water spray producing blades, said tank being provided around its top with a marginal supporting ledge and rims, a casing supported on said ledge and rising above the tank and provided on its interior with a plurality of longitudinally spaced baffles for separating excess moisture from the circulating air, and means for producing the circulation and discharging of air.

3. In an air condition apparatus of the class described, an open top water tank, a pair of uprights arranged in said tank and provided with bearings, a shaft mounted for rotation in said bearings, operating means for the shaft, a plurality of longitudinally spaced cones mounted on the shaft, a disk associated with the open side of each cone, the peripheral edge portions of the disk being serrated to provide agitating and water spray producing blades, said tank being provided around its top with a marginal supporting ledge and rims, a casing supported on said ledge and rising above the tank and provided on its interior with a plurality of longitudinally spaced baffles for separating excess moisture from the circulating air, means for producing the circulation and discharging of air, comprising a fan housing, a fan rotatably mounted in said housing, said housing being provided with a conditioned air outlet.

In testimony whereof I affix my signature.

WILLIAM S. TONCRAY.